United States Patent [19]

Heald

[11] 3,805,552

[45] Apr. 23, 1974

[54] RADIAL SPLINE GUIDE BEARING ASSEMBLY

[75] Inventor: Walter R. Heald, Richland, Wash.

[73] Assignee: The United States of America as represented by the United States Atomic Energy Commission, Washington, D.C.

[22] Filed: Oct. 17, 1972

[21] Appl. No.: 298,202

[52] U.S. Cl............. 64/23, 74/446, 308/3 R, 403/30, 403/359
[51] Int. Cl............................................ F16d 3/06
[58] Field of Search....... 287/58 CT, 53 SS; 74/446; 64/23 R, 9; 308/3 R, 4 R; 403/359, 30

[56] References Cited
UNITED STATES PATENTS

| 3,399,549 | 9/1968 | Nagele | 64/23 |
| 3,577,795 | 5/1971 | Bennett | 287/53 SS |
| 3,619,882 | 11/1971 | Sobanski et al. | 287/53 SS |
| 3,621,945 | 11/1971 | Spry | 287/53 SS |

Primary Examiner—Samuel Scott
Assistant Examiner—Randall Heald
Attorney, Agent, or Firm—John A. Horan; Arthur A. Churm; Hugh W. Glenn

[57] ABSTRACT

An elongated shaft is axially assembled within a guide bearing which provides lateral support while permitting longitudinal movement. The bearing includes inwardly projecting ribs which intermesh with outwardly projecting splines from the shaft. Adjacent lateral guide surfaces of the ribs and splines are in slidable contact and each guide surface coincides with a radius from the longitudinal axis of the assembly. Space for unequal thermal expansion of the member and bearing is provided beyond the distal surfaces of the splines and ribs.

2 Claims, 4 Drawing Figures

PATENTED APR 23 1974 3,805,552

RADIAL SPLINE GUIDE BEARING ASSEMBLY

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to guide bearing assemblies for providing lateral support and accurate positioning of longitudinal members. It has particular applicability for structural support within a nuclear reactor and in other high-temperature applications where temperature differences in time or along the length of the assembly may be encountered. Differences in the amount of thermal expansion or contraction in corresponding sections of a guide bearing and a supported shaft member can cause binding and prevent relative longitudinal motion. Subsequent vibration or other stress-producing forces can damage the bearing or other components in the system. Contrastingly, a loosely held or positioned structural member could produce unpredictable effects on reactivity if fuel or control elements with a nuclear reactor are involved.

In some instances binding can result when longitudinal temperature differences occur along a member and relative longitudinal movement brings an expanded member portion into a normal or contracted bearing portion. Similar problems can arise if dissimilar metals having different thermal expansion characteristics are employed for the guide bearing and the supported shaft member. For example, an aluminum member supported within a carbon steel guide bearing could bind or become loosely positioned when subjected to variations in temperature.

The present invention also has application to splined coupling or clutch devices when axial motion between two coupling members is desired and differences in thermal expansion of the members creates a potential for binding, or loose fit.

DESCRIPTION OF PRIOR ART

Previous guide bearings and coupling devices often employed square-shaped or arbitrarily sloped splines to interlock mating members. Adequate clearances have been provided to accommodate possible thermal deformation. Where close clearances or contact between surfaces were required for accurate positioning or transmission of power, rubber or other deformable material was placed intermediate metal surfaces. Relative motion between the metal surfaces was accommodated by layers of antifriction substance within the deformable material. However, these techniques become unsuitable for use at the elevated temperatures of several hundred degrees Fahrenheit found within an operating nuclear reactor and in other high-temperature applications. Further, precise positioning of fuel and control elements for reactivity control is made more difficult when deformable material is used between guide surfaces in structural and support members.

SUMMARY OF THE INVENTION

Therefore in view of the limitations of the prior art, it is an object of the present invention to provide a guide bearing assembly for accurate lateral alignment while allowing axial movement of a longitudinally extending member.

It is a further object to provide an assembly which permits such lateral alignment and axial movement over wide temperature variations in time as well as along the length of the assembly.

It is also an object to provide such an assembly with dissimilar metals having different coefficients of thermal expansion and contraction within the guide bearing and supported member but yet prevent binding or lateral instability.

In accordance with the present invention, an elongated member is laterally supported in coaxial alignment within a guide bearing opening. The guide bearing includes inwardly projecting rib sections on its internal surface extending axially through the length of the bearing. A portion of the elongated member passing through the guide bearing includes outwardly projecting splines positioned alternately between the inwardly projecting rib sections. Each spline includes lateral guide surfaces disposed adjacent to and at a minimum clearance from corresponding lateral guide surfaces on the rib sections. Each guide surface on a spline and on a rib section coincides with a radius from the axis of the assembly.

BRIEF DESCRIPTION OF THE DRAWINGS

The present invention is illustrated within the accompanying drawings wherein.

DETAILED DESCRIPTION OF THE PREFERRED EMBODIMENTS

Figure 1:
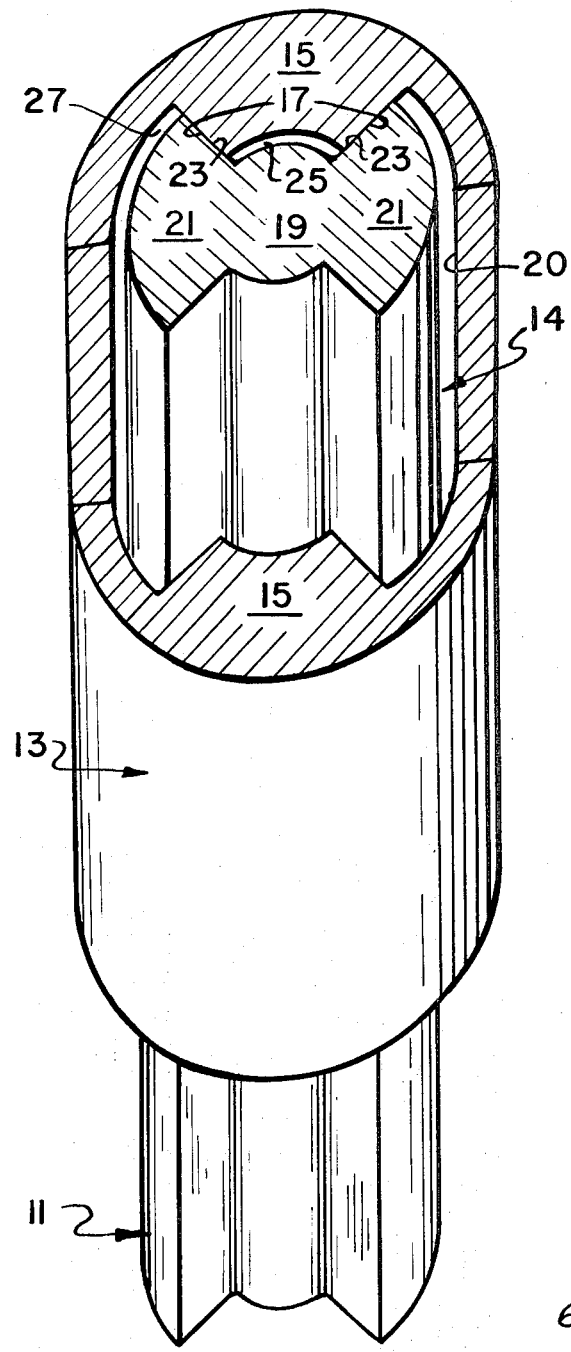
FIG. 1 is a partially cutaway perspective view of a guide bearing and elongated shaft member assembly.

Turning now to FIG. 1, an elongated shaft member 11 is axially positioned within a generally tubular guide bearing 13 having an axial passageway 14. Shaft member 11 can, for instance, be a support member employed within a nuclear reactor for vessel or fuel element assembly support. Although guide bearing 13 is shown having a cylindrical exterior, it will be clear that other external forms including a continuous structural member or wall can be used depending on the particular application.

Guide bearing 13 is shown having two truncated quadrantal sectors or ribs 15 which project inwardly from its internal surface into passageway 14 and extend axially along its length. The lateral surfaces 17 of ribs 15 coincide with radii from the common longitudinal axis of bearing 13 and shaft member 11.

Shaft member 11 includes a central cylindrical portion 19 and two oppositely disposed quadrantal portions or splines 21. In order to permit axial movement of member 11, lateral surfaces 23 of splines 21 slidably engage corresponding adjacent surfaces 17 of ribs 15. Accordingly, surfaces 23 as well as surfaces 17 coincide with radii from the longitudinal axis of member 11 and each surface 23 is minimally spaced from the corresponding rib surface 17. This close clearance or actual contact between surfaces 23 and 17 is such as to provide accurate lateral support and positioning of shaft member 11 and of any rigidly adjoined member while still permitting axial motion. In nuclear reactors precise positioning of fuel element assemblies, which may be attached directly or indirectly to member 11, is required for reactivity control; however, some allowance for axial motion or vibration is often desirable, particularly in test reactors that are designed to purposely simulate potentially violent emergency conditions.

Thermal expansion and contraction of shaft members 11 and guide bearing 13 is accommodated within void annular volumes 25 and 27. Void volumes 25 are defined between the distal surfaces of ribs 15 and central portion 19 of shaft member 11, while void volumes 27 are between the distal surfaces of splines 21 and the internal cylindrical surface 20 of bearing 13. Although no allowances for thermal expansion are maintained between surfaces 23 and 17, it will be clear from the following discussion that all motion at these surfaces resulting from symmetrical heating will be along the respective surface, that is along a radius from the central axis of the member. Consequently, no binding will ordinarily result from thermal expansion or contraction of either or both the shaft member and the guide bearing.

Figure 2:
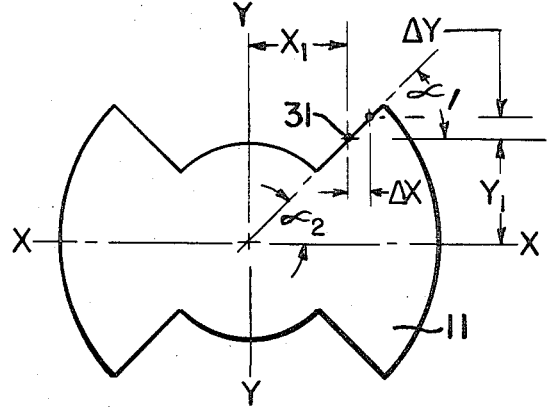
FIG. 2 is a graphical illustration of particle motion at communicating surfaces within the assembly of FIG. 1.

Referring now to FIG. 2, a schematic end view of a member 11 is superimposed with $x$ and $y$ axes along perpendicular centerlines of the member. Any particle 31 on the surface of the member will tend to move a distance represented by $\Delta x$ and $\Delta y$ in respect to the axes as a result of the temperature variations. Assuming the temperature variations are uniform throughout the cross section of the member, the thermal deformation is given by the following equation given in Miller and Doeringsfeld, MECHANICS OF MATERIALS, p. 29, International Textbook Co. 1955.

$$e = k\Delta t\, L$$

Eq. 1 where:
 $e$ is the thermal deformation or elongation
 $k$ is the thermal coefficient for linear expansion and contraction
 $\Delta t$ is the change in temperature
 $L$ is the linear dimension which sustains the deformation.

It is apparent from this equation that thermal deformation of a member consisting of a uniform material and subjected to uniform temperature variations throughout will be in proportion to the length or dimension of the member In respect to FIG. 2, this means that:

$$\Delta x/x_1 = \Delta y/y_1$$

Eq. 2 and that:

$$\Delta x/\Delta y = x_1/y_1$$

Eq. 3

Therefore the angle $\alpha_1$ corresponding to the angle the particle path makes with the $x$ axis must be the same as the angle $\alpha_2$, corresponding to a radius extending from the origin (longitudinal axis) through the original particle location. Consequently, all lateral expansion and contraction of shaft member 11 will tend to be along radii from the longitudinal axis and ordinary binding or loosening along radially disposed surfaces is avoided. Similar reasoning with respect to the lateral surfaces 17 of guide bearing 13 will reveal that uniform temperature variation within that member will not distort these guide surfaces.

In applications where a large temperature gradient is established between the longitudinal axis and particle 31, there may be some motion of particles across the radial lines or surfaces due to unequal distortion in different portions of the member. However, the risk of binding between the members can be reduced if 90 degree sectors or quadrants are employed for splines 21 as is illustrated in FIGS. 1 and 2. Expansion force vectors perpendicular to one spline surface will be parallel to the adjacent surface of the same spline and may thereby be relieved in the space provided for expansion at the distal surface of that spline. As shown in FIG. 2, the use of two oppositely disposed 90° sectors or quadrants for the splines on the shaft member will result in surfaces aligned at 45° to the axis of symmetry. It will be apparent that oppositely disposed, quadrantal rib sectors within the guide bearing will exhibit the same characteristics and, as illustrated in FIG. 1, can be intermeshed at close clearances or in contact with the quadrantal splines.

Moreover, the use of quadrantal rib and spline sectors provides lateral support to the shaft member 11 from all four directions. A shaft and bearing assembly including two oppositely disposed but thinner splines than in the above-described embodiment would attain less lateral stability. Additional thin spline sectors would result in greater stability but at the expense of increased difficulty in fabrication.

In some instances, different materials having different characteristics of thermal distortion may be used for the bearing and shaft members. Where each member is of a uniform composition, distortion of the respective member will be along the radial surfaces. Although one member may distort more or less than the mating member, the void volumes at 25 and 27 of FIG. 1 can be made sufficiently large to accommodate the difference in deformation. The physical effect thus demonstrated is basically the same as that encountered when longitudinal portions of the bearing and shaft member having different temperatures are repositioned in mating correspondence.

As an example, a guide bearing assembly was constructed with an aluminum shaft member having a thermal coefficient of linear expansion of $12.8 \times 10^{-6}/°F$ supported within a carbon steel bearing having a thermal coefficient of linear expansion of $6.5 \times 10^{-6}/°F$. The members were fabricated and assembled at ambient temperature substantially as shown in FIG. 1 so as to provide a snug slip fit at surfaces 17 and 23. The assembly was heated to approximately 1,000° F and no substantial binding or loosening between the members was evident. Also, each member was individually heated to about 1,000° F while the other remained at room temperature without interfering with the slip fit.

Figure 3:
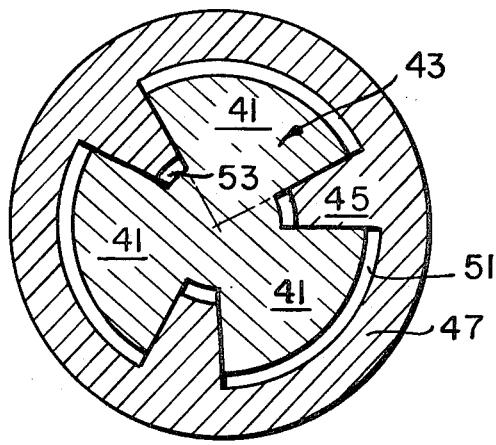
FIG. 3 is a cross-sectional end view showing an alternative configuration of the FIG. 1 assembly.

An alternative configuration of the guide bearing assembly is shown in FIG. 3. Three outwardly projecting splines 41 from a shaft member 43 are shown intermeshed with three inwardly extending ribs 45 of guide bearing 47. Each spline 41 is a 90° sector of the shaft member and the mating surfaces of the splines and ribs coincide with radii from the longitudinal axis as previously discussed. Void volumes 51 and 53 allow for radial expansion and contraction. This configuration provides additional surfaces for lateral support and positioning of shaft member 43 over that provided by the FIG. 1 embodiment.

Figure 4:
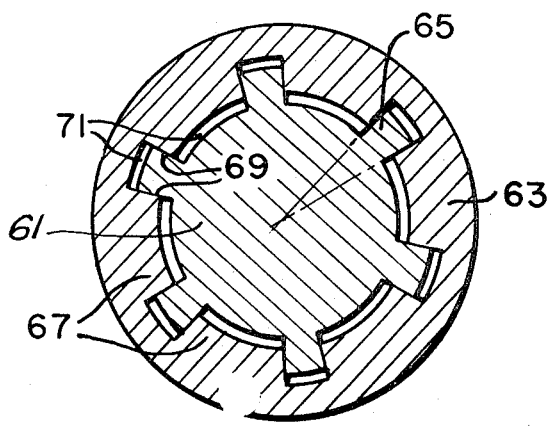
FIG. 4 is a cross-sectional end view showing yet another embodiment of the assembly shown in FIG. 1.

FIG. 4 shows another embodiment of the present invention that can be used in applications where a number of small splines distributed around a shaft circumference are desirable. For instance, mechanical couplings and clutch devices require that a substantial portion of the shaft diameter remain uncut while sufficient lateral surface is provided for torque transmission. It may also be desirable to permit axial movement, vibration or expansion between the coupling components without damage or misalignment. To achieve these purposes, a central shaft member 61 is axially positioned within a guide bearing or coupling member 63 with equally spaced intermeshing splines 65 and ribs 67 communicating along radial surfaces 69. Annular portions 71 are provided for radial expansion intermediate the two interlocking members. Torque transmission as well as relative axial movement between the members can be accommodated at surfaces 69. Since surfaces 69 coincide with radii from the longitudinal axis of the shaft 61 and coupling member 63, no binding or loosening will normally result from temperature changes that do not produce non-uniform gradients across the assembly.

It will be apparent from the above discussion that the present invention provides a guide bearing assembly for precise alignment and lateral support of a shaft member while permitting relative axial movement. Binding or loosening at the mating guide surfaces is minimized or avoided by employing guide surfaces which coincide with radii from the longitudinal axis of the assembly. To provide four-directional lateral support with relative ease of fabrication, oppositely disposed quadrantal sectors are selected as intermeshing ribs and splines with radial intercommunicating guide surfaces. Axial temperature differences will not prevent axial motion since local expansion and contraction of the members will generally be along and not across the radial surfaces as discussed. Accordingly, an elongated shaft member supporting nuclear fuel assemblies or vessels within a nuclear facility can be purposely moved or allowed to expand or vibrate in longitudinal directions. Power transmission through clutches and coupling can also be in accordance with the present invention while allowing for axial motion or expansion.

Although the present invention has been described with specificity in respect to a select few embodiments, it will be clear that numerous other applications and embodiments can be produced within the scope of the present invention as defined in the appended claims.

The embodiments of the present invention in which an exclusive property or privilege is claimed are defined as follows:

1. In an elongated shaft and guide bearing combination for use in applications subjected to wide temperature variations, wherein said shaft and bearing being of different metals having different coefficients of thermal expansion, said bearing having a longitudinal opening with said shaft being axially positioned therein and adapted for axial movement in respect to said bearing, the improvement comprising: two oppositely disposed, quadrantal splines extending outwardly along the length of said shaft, each of said splines having mutually perpendicular, lateral surfaces coinciding with radii from the longitudinal axis of said shaft; two, oppositely disposed, quadrantal ribs projecting into said opening along the length of said bearing in an intermeshing relationship with said splines, said ribs having lateral surfaces at sufficient clearances from adjacent lateral surfaces of said splines to provide a freely slidable fit relative to said shaft and bearing and to provide positional support of said shaft in all lateral directions with adjacent lateral surfaces of said splines to provide positional support of said shaft in all lateral directions.

2. The combination of claim 1 wherein the distal surfaces of said inwardly projecting rib sections are substantially spaced from the center portion of said elongated member and the distal surfaces of said outwardly projecting splines are substantially spaced from the internal surface of said guide bearing to provide space for thermal expansion and contraction of said elongated member and said bearing.

* * * * *